United States Patent [19]

Combes

[11] 4,370,893
[45] Feb. 1, 1983

[54] ORIFICE METER WITH REPLACABLE ORIFICE DISC

[75] Inventor: Marvin G. Combes, Castro Valley, Calif.

[73] Assignee: Grove Valve and Regulator Company, Oakland, Calif.

[21] Appl. No.: 271,637

[22] Filed: Jun. 8, 1981

[51] Int. Cl.³ .............................................. G01F 1/42
[52] U.S. Cl. ................................ 73/861.61; 73/432 R
[58] Field of Search ............... 73/861.61, 861.62, 86, 73/432 B

[56] References Cited

U.S. PATENT DOCUMENTS

| | | | |
|---|---|---|---|
| 2,217,643 | 10/1940 | Rude | 73/861.62 |
| 3,037,384 | 6/1962 | Good | 73/861.62 |
| 3,079,796 | 3/1963 | Freudenthal et al. | 73/861.62 |
| 3,779,076 | 12/1973 | Akeley | 73/861.61 |
| 4,343,193 | 8/1982 | Dawson et al. | 73/861.61 |

Primary Examiner—Howard A. Birmiel
Attorney, Agent, or Firm—Melvin R. Stidham

[57] ABSTRACT

An orifice meter comprising a gate valve type of body with an oval body band clamped between a pair of parallel plates. A gate-like carrier slides between the plates and carries an orifice disc with seal ring surrounding it. The seal rings seal around the flow passage and the orifice disc is large enough to be held place by engagement with the adjacent wall plate. In a more remote position, the seal rings may seal around an access opening, which is larger than the orifice disc so that by removing a closure plate, the orifice disc can be rapidly replaced.

6 Claims, 3 Drawing Figures

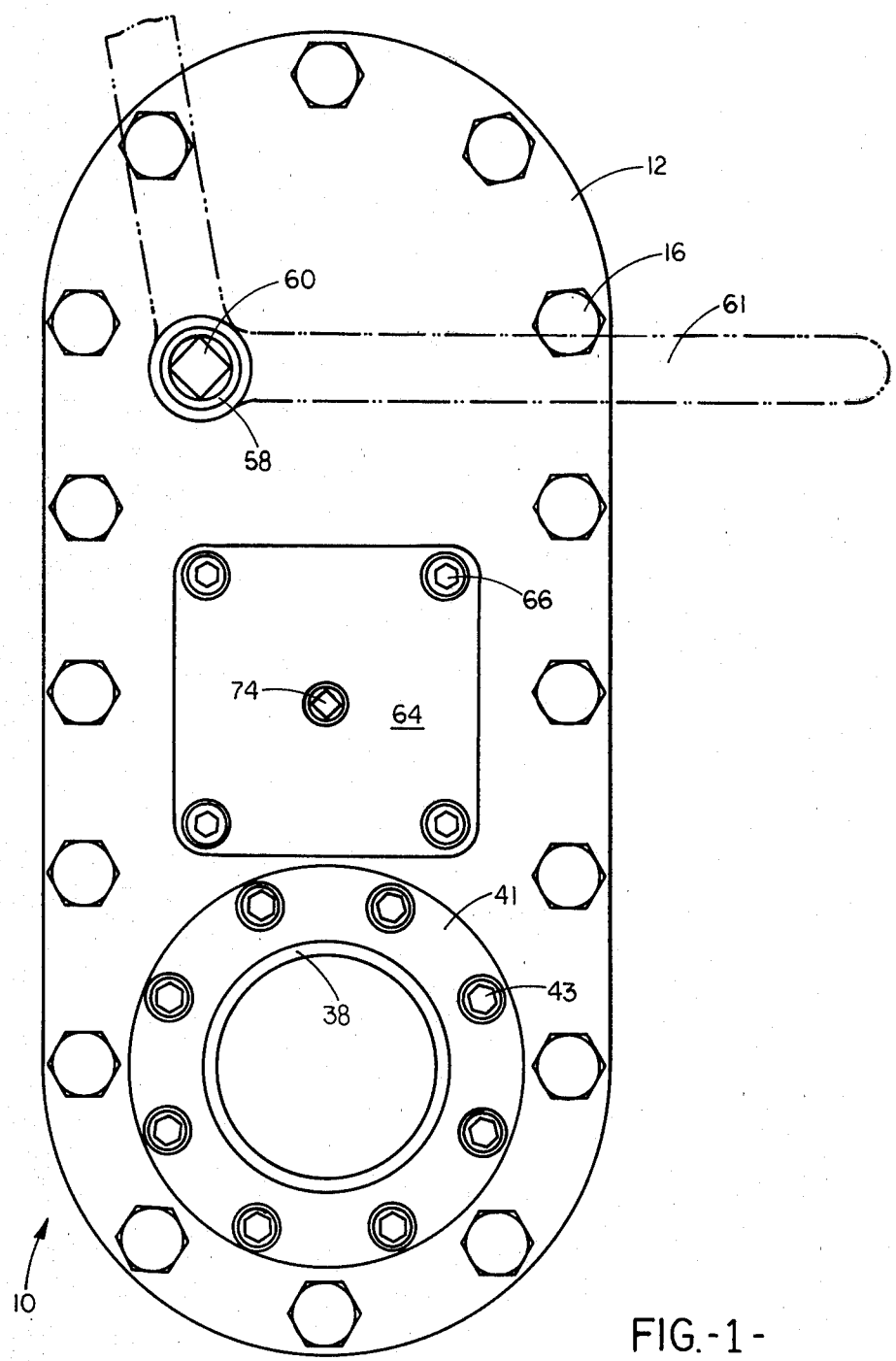
FIG.-1-

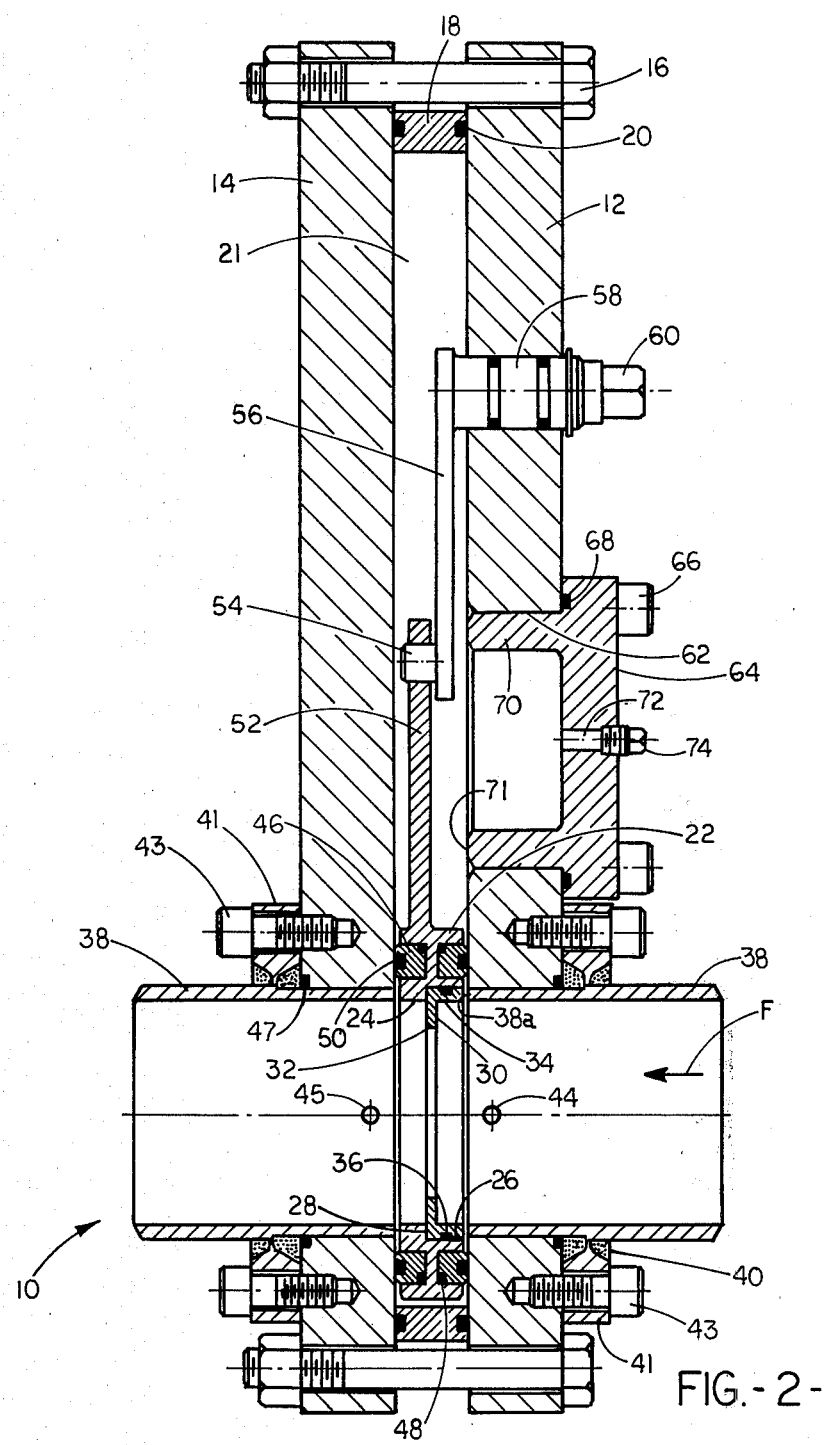
FIG.-2-

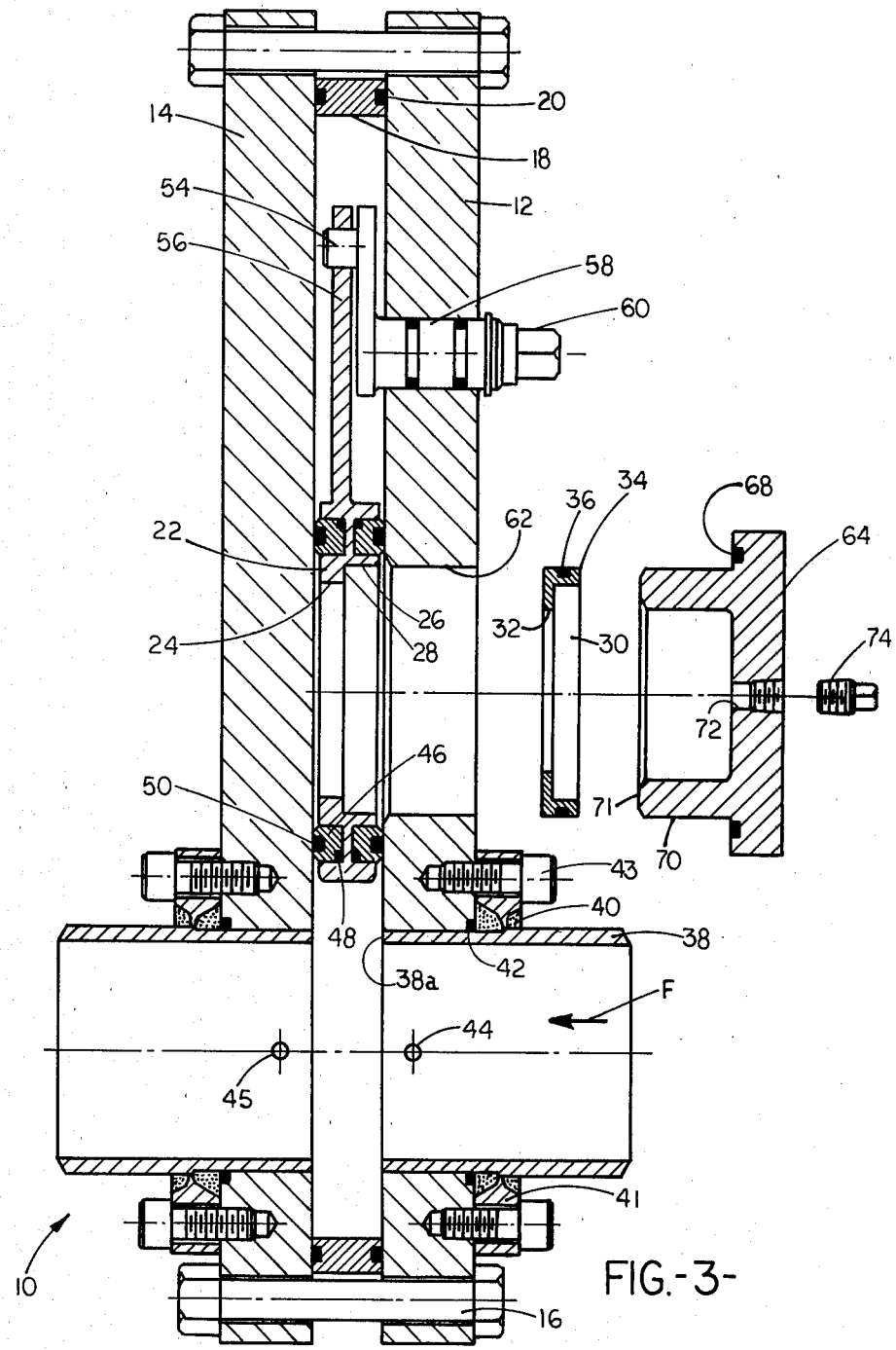

4,370,893

ORIFICE METER WITH REPLACABLE ORIFICE DISC

BACKGROUND OF THE INVENTION

Natural gas is generally sold by volumetric measurement, and one way to measure the flowing gas is by passing it through an orifice of a fixed, predetermined size and measuring the pressure drop across the orifice. An orifice meter or fitting comprises a housing within which a disc with an orifice is supported in a flow passage. The orifice fitting is installed in a gas pipeline, and is fitted with pressure taps for measuring pressure immediately upstream and immediately downstream of the orifice. Because the orifice plate is subject to wear by impacting of sand, line scale and other foreign particles in the flowing stream, it must be replaced at frequent intervals to ensure accuracy in measurement.

Existing orifice fittings are generally of two types. The most basic, or junior type, is simply a housing which is installed in the pipeline and includes a closure plate or the like to be removed for changing orifice plates. With this type, the flow through the pipeline section must be cut off or by-passed during the time that the housing is open for removal and replacement of the orifice disc. In the more sophisticated or senior orifice fitting, the valve body is provided with a separate chamber radially displaced from the pipeline, into which the orifice carrier may be moved while the gas continues to flow through the pipeline itself. However, even with such senior fittings, it is necessary to move the orifice disc carrier into the displaced chamber; to seal the chamber off from the pipeline itself; and to bleed the chamber before opening it for access to the orifice carrier for replacement of the orifice disc. The operation also generally includes the removal and replacement of a plurality of bolts or screws which secure the orifice disc onto the orifice carrier. This entire operation may require a considerable amount of time during which, customarily, the immediately preceding rate of flow is assumed to continue. However, this assumption may not be correct for the entire period of downtime, and the longer that period continues, the greater the chance for error.

OBJECTS OF THE INVENTION

It is an object of this invention to provide an orifice fitting wherein an orifice disc may be removed and replaced in a minimum amount of time.

It is a further object of this invention to provide an orifice fitting wherein an orifice disc may be removed and replaced with a minimum number of manual operations.

It is a further object of this invention to provided an orifice fitting wherein an orifice disc may be removed and replaced with simple, conventional hand tools.

Other objects and advantages of this invention will become apparent from the description to follow, particularly when read in conjunction with the accompanying drawings.

SUMMARY OF THE INVENTION

In carrying out this invention, there is provided a gate valve type body having a pair of parallel body plates which are clamped against a body band to form a sealed enclosure. An annular gate-type orifice disc carrier is slidable between the two body plates, and seal rings on both sides of the carrier maintain sealing engagement with the body plates. An orifice disc is supported on the carrier without bolts or other attaching means, being held in place by engagement with a body plate. The orifice disc is of an outer diameter larger than the flow passageways but smaller then the seals so that in active position, it is held in the flow passage while a seal ring seals around it to prevent a leak path around the orifice. A disc access or replacement opening is formed in one of the body plates displaced from the flow passage and is of an diameter larger then the disc but smaller then the seal ring so that when the valve carrier is moved to a position opposite the opening, a seal is maintained around it to isolate it from the rest of the body space, but the orifice disc is readily accessible for removal upon removing a closure covering the disc replacement opening.

BRIEF DESCRIPTION OF THE DRAWINGS

In the drawings:

FIG. 1 is an elevation view of an orifice fitting embodying features of this invention;

FIG. 2 is a vertical section view of the orifice fitting with the orifice in active position; and FIG. 3 is a vertical section view of the orifice fitting with orifice carrier in position for removal of the orifice disc.

DESCRIPTION OF A PREFERRED EMBODIMENT

Referring now to FIGS. 1 and 2 with greater particularity, the orifice meter or fitting 10 of this invention comprises a pair of parallel steel body plates 12 and 14, which are secured together by a plurality of bolts 16 clamping them against the edges of an oval body band 18 carrying resilient seal rings 20 to form a sealed enclosure 21 between the body plate 12 and 14. This is similar to the gate valve structure shown in M. H. Grove U.S. Pat. No. 3,069,129.

Slidably carried between the parallel plates 12 and 14 is a gate-like carrier 22, which is of annular configuration with an opening 24 therethrough and counterbored at 26 to form an internal shoulder 28. Supported against the internal shoulder 28 is the orifice disc 30 having an orifice 32 therethrough of a predetermined size. An annular axial flange 34 on the orifice disc 30 carries a seal ring 36 to prevent the occurence of a leak path around the orifice disc 30. As shown, the internal diameter of the axial flange 34, as well as the internal diameter of the opening 24 are substantially equal to the internal diameter of the flow tubes 38.

The flow tubes 38 may each comprise a section of a pipe of predetermined diameter dictated by various factors governing flow measurement, which are welded at 40 into mounting ring 41. The mounting rings 41 are sealed at 42 and are bolted to the valve plates 12 and 14 by means of cap screws 43. Pressure taps 44 and 45 are drilled at fixed distances upstream and downstream of the orifice disc 30 so that the pressure differential across the orifice 32 can be determined.

Carried on each side of the annular carrier 22 is a seat ring 46 carrying a resilient outer seal 48 and a resilient main seal 50. The main seals 50 on opposite sides of the carrier 22 maintain constant sealing engagement with the valve plates 12 and 14 so that, in any position thereof, the portion of the orifice carrier 22 radially inside of the main seal rings 50 is in sealed isolation from the remainder of valve body space 21.

The orifice carrier 22 has an integral panhandle stem 52 which is pivoted at 54 on a crank arm 56, carried on a sealed, rotatable shaft 58 with a squared end 60 for partial rotation, as by means of a suitable wrench 61 (FIG. 1).

Displaced from the flow passageway 38 is an orifice disc replacement opening 62, which is of a diameter larger than the outer diameter of the orifice disc 30, but smaller than the diameter of the seat rings 46. This disc replacement opening 62 is normally closed by a closure plate 64 which is bolted at 66 to the valve body plate 12 and sealed against the valve plate 12, as by means of an O-ring 68. Carried on the closure plate 64 is an inwardly extending annular or circular plug 70, having an inner, orifice disc retaining surface 71. In the closure plate 64 is a vent port 72 which is normally closed by a threaded plug 74.

In operation, with the orifice carrier 22 in the position shown in FIG. 2, wherein the orifice disc 30 is disposed coaxially with the flow passageway 38, the disc 30 is held in position by engagement of the edge of the annular flange 34 with the inner edge 38a of the passageway hub and also by the force of the gas flowing in the direction of arrow F pressing it against the internal shoulder 28. Then, as the crank arm 56 is pivoted to move the carrier 22 upward, the orifice disc is held in place by sliding engagement of the annular flange with the inner surface of planar body wall 12, and it is held in position as it traverses the removal opening 62 by reason of engagement with the inner surface of the plug 70.

In this position, with the orifice carrier 22 in the position shown in FIG. 3 opposing the opening 62, the opening 62 is sealed off from the remainder of the body space 21 by reason of continued sealed engagement of the seal rings 50 with the parallel body plates 12 and 14. Then, the vent plug 74 may be removed to vent just that space within the main seal rings 50 and, thereafter, the cap screws 66 are threaded out for removal of the closure 64. In this condition, the orifice disc 30 is fully accessible and the operator may simply reach in, remove it and replace it, with no screws or other attaching means to be unthreaded or threaded. When the plug 64 is replaced, the orifice disc 30 is again held in place without screws or other attaching means.

While this invention has been described in conjunction with a preferred embodiment thereof, it is obvious that modifications and changes therein may be made by those skilled in the art to which it pertains, without departing from the spirit and scope of this invention, as defined by the claims appended hereto.

What is claimed as invention is:

1. An orifice meter comprising:
   gate valve type body construction including a pair of parallel, planar walls having aligned circular flow passages therethrough;
   a movable carrier between said walls;
   means for moving said carrier between a first position aligned with said flow passages and a second position displaced therefrom; and
   annular seal means on both sides of said carrier of a diameter greater than said flow passages and operative to maintain sealing engagement with said planar walls;
   said structure being characterized in that:
   said carrier has an opening therethrough and a circular recess on one side thereof of a diameter greater than said flow passages but less than said seal means;
   an orifice disc received in said recess;
   a seal ring around said orifice disc;
   an orifice replacement opening through one of said walls aligned with said second position, said opening being of a diameter greater than that of said orifice disc but less than that of said annular seal means; and
   a closure member normally covering said replacement opening.

2. The orifice meter defined by claim 1 including:
   an annular axial flange around said orifice disc;
   the inner diameter of said axial flange being substantially equal to the inner diameter of said flow passages.

3. The orifice meter defined by claim 1 wherein:
   said closure member comprises a plug fitting in said replacement opening and having an inner surface substantially flush with the inner surface of said one wall; and including:
   an integral plate of said plug; and
   screw means releasably securing said plate to said one wall.

4. The orifice meter defined by claim 1 wherein:
   at least one of said annular seal means comprises:
   annular recess in said movable member;
   a seat ring slidable axially in said recess;
   an outer seal ring sealing around the outer diameter of said seat ring; and
   main seal ring carried on the outer face of said seat ring.

5. The orifice meter defined by claims 1 including:
   a vent hole through said closure member; and
   a screw plug in said vent hole.

6. The orifice meter defined by claim 1 wherein:
   said movable member and said orifice disc are free of securing means.

* * * * *